US010761900B1

(12) United States Patent
Spina et al.

(10) Patent No.: US 10,761,900 B1
(45) Date of Patent: Sep. 1, 2020

(54) SYSTEM AND METHOD FOR SECURE DISTRIBUTED PROCESSING ACROSS NETWORKS OF HETEROGENEOUS PROCESSING NODES

(71) Applicant: V2COM, Inc., Austin, TX (US)

(72) Inventors: Guilherme Spina, São Paulo (BR); Leonardo de Moura Rocha Lima, Austin, TX (US)

(73) Assignee: V2Com S.A., Sao Paulo, SP (BR)

( * ) Notice: Subject to any disclaimer, the term of this patent is extended or adjusted under 35 U.S.C. 154(b) by 4 days.

(21) Appl. No.: 15/948,905

(22) Filed: Apr. 9, 2018

Related U.S. Application Data

(63) Continuation-in-part of application No. 15/143,047, filed on Apr. 29, 2016, now abandoned, and a continuation-in-part of application No. 15/143,143, filed on Apr. 29, 2016, now Pat. No. 10,063,658.

(60) Provisional application No. 62/637,267, filed on Mar. 1, 2018, provisional application No. 62/155,094, filed on Apr. 30, 2015, provisional application No. 62/155,094, filed on Apr. 30, 2015.

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 4,903,015 | A | 2/1990 | Van Steenbrugge et al. |
| 4,958,342 | A | 9/1990 | Williams et al. |
| 5,448,554 | A | 9/1995 | Van Steenbrugge |
| 5,479,498 | A | 12/1995 | Brandman et al. |
| 6,014,705 | A | 1/2000 | Koenck et al. |

(Continued)

OTHER PUBLICATIONS

Communication from a Related Counterpart Application, "Non-Final Office Action" dated Apr. 2, 2018, U.S. Appl. No. 15/143,143, filed Apr. 29, 2016, 7 pages.

(Continued)

*Primary Examiner* — Brian Whipple
(74) *Attorney, Agent, or Firm* — Dickinson Wright, PLLC; Stephen A. Mason; Jonathan H. Harder

(57) ABSTRACT

A method for distributed processing includes receiving a job bundle at a command center comprising a processor, a network interface, and a memory. The method includes determining a value of a dimension of the job bundle, determining, based on a predetermined rule applied to the determined value of the dimension of the job bundle, an aggregate processing cost for the job bundle and identifying one or more available member devices communicatively connected to the command center via the network interface. Additionally, the method includes the operations of splitting the job bundle into one or more threads based on at least one of the determined value of the dimension, the aggregate processing cost or the available member devices, apportioning a thread of the one or more threads to a member device and transmitting, via the network interface, the apportioned thread to a secure processing environment of the member device.

20 Claims, 6 Drawing Sheets

(56) References Cited

U.S. PATENT DOCUMENTS

| | | |
|---|---|---|
| 6,697,364 B1 | 2/2004 | Kekki et al. |
| 2004/0018851 A1 | 1/2004 | Koenck et al. |
| 2004/0243386 A1 | 12/2004 | Stolowitz et al. |
| 2005/0097302 A1* | 5/2005 | Suzuoki .............. G06F 12/1466 |
| | | 712/34 |
| 2006/0007888 A1 | 1/2006 | Lee et al. |
| 2006/0075079 A1* | 4/2006 | Powers ................ G06F 9/5072 |
| | | 709/220 |
| 2008/0117810 A1 | 5/2008 | Stott et al. |
| 2008/0256167 A1* | 10/2008 | Branson ............... G06F 9/5027 |
| | | 709/201 |
| 2008/0313601 A1 | 12/2008 | Huang et al. |
| 2009/0046681 A1 | 2/2009 | Kalogridis et al. |
| 2009/0103453 A1 | 4/2009 | Hand et al. |
| 2010/0067458 A1 | 3/2010 | Tanigawa et al. |
| 2012/0210384 A1 | 8/2012 | Cirstea et al. |
| 2012/0210385 A1 | 8/2012 | Cirstea et al. |
| 2014/0156777 A1* | 6/2014 | Subbiah .............. H04L 67/1097 |
| | | 709/213 |
| 2014/0201318 A1 | 7/2014 | Dajani et al. |
| 2014/0344809 A1 | 11/2014 | Jin et al. |
| 2014/0351451 A1 | 11/2014 | Fu et al. |
| 2014/0376473 A1 | 12/2014 | Leng et al. |
| 2015/0006716 A1* | 1/2015 | Suchter ................ G06F 9/5038 |
| | | 709/224 |
| 2015/0074198 A1 | 3/2015 | Liu et al. |
| 2017/0185452 A1 | 6/2017 | Cao et al. |
| 2017/0279734 A1 | 9/2017 | Goncalves et al. |
| 2017/0308411 A1 | 10/2017 | Brill |
| 2017/0351551 A1* | 12/2017 | Manhardt ............ G06F 9/5066 |
| 2018/0027099 A1 | 1/2018 | Dajani et al. |

OTHER PUBLICATIONS

International Search Report and Written Opinion for related application PCT/US19/019896, dated May 28, 2019; 14 pages.

* cited by examiner

SYSTEM AND METHOD FOR SECURE DISTRIBUTED PROCESSING ACROSS NETWORKS OF HETEROGENEOUS PROCESSING NODES

CROSS-REFERENCE TO RELATED APPLICATIONS

This application is a continuation-in-part of U.S. application Ser. No. 15/143,143 entitled "DEDICATED NETWORK PLATFORM FOR DATA PRODUCING DEVICES THAT EMULATES DISTINCT DATA AND CONTROL CHANNELS VIA BIFURCATION OF SINGLE CHANNEL ENVIRONMENTS" filed Apr. 29, 2016 and claiming priority to U.S. Provisional Application No. 62/155,094, filed Apr. 30, 2015. This application is a continuation-in-part of U.S. application Ser. No. 15/143,047 entitled "CONTROL SYSTEM WITH PERSISTENT AND TRANSIENT DATA STORES FOR REGISTRATION, PRODUCTION AND STATUS DATA FOR NETWORKED DEVICES" filed Apr. 26, 2016 and claiming priority to U.S. Provisional Application No. 62/155,094, filed Apr. 30, 2015. This application claims priority under 35 U.S.C. § 119(e) to U.S. Provisional Application No. 62/637,267 filed Mar. 1, 2018 entitled "SYSTEM AND METHOD FOR SECURE DISTRIBUTED PROCESSING ACROSS NETWORKS OF HETEROGENEOUS PROCESSING NODES." The above-identified patent applications are hereby incorporated by reference in their entireties.

TECHNICAL FIELD

This disclosure relates generally to distributed computing and the Internet of Things (IoT). More specifically, this disclosure relates to systems and methods for secure distributed processing across networks of heterogeneous processing nodes.

BACKGROUND

The proliferation of processor implemented control of non-computing devices, in both the public context (e.g., streetlights, traffic signals, electrical meters) and the home (e.g., internet connected lights, home automation systems, media streaming platforms), sometimes referred to as the "Internet of Things" (IoT) presents, at a minimum, a vast, largely untapped opportunity for the collection and processing of data at previously unimaginable scale and levels of granularity. For example, the controllers used in certain IoT home automation systems may, during the course of their intended operation, spend the bulk of their time monitoring and collecting temperatures inside and outside of a house. While monitoring and recording temperature data is typically not computationally expensive, as such, does not require a powerful processor, an IoT controller may, nonetheless possess substantial processing and memory resources to support occasional, computationally demanding operations, such as voice recognition.

A modern home may have multiple devices having similar sensor technology and processing capabilities as the home automation controller described above. Taken together, these devices can potentially be used to collect a wealth of highly granular data as to their environment (for example, block by block temperature data), as well as unused processing capacity to analyze and process such data. Beyond the possibilities for data science and mining data on massive scales, the ability to orchestrate and collectivize the processing power of a cloud or "fog" of small, networked processors presents new opportunities to extend the useful life of legacy devices, such as older personal computers, tablets, and phones, whose processing and data collection resources, while perhaps no longer suitable to support applications on subsequent generations of the same devices, could still be usefully applied as part of a larger processing network. Further applications of secure distributed processing across networks of heterogeneous processing nodes include, without limitation, providing CPU power to support proof-of-work based systems for verifying transactions recorded in a distributed ledger.

Realizing this wealth of unused computational power and sensor data presents significant technical challenges, including without limitation, orchestration issues (e.g., breaking up a processing task among numerous small processors) and security issues, such as protecting users' privacy and guarding against misuse of devices' sensors and processing capabilities, such as by surreptitiously recording conversations inside a house, or coopting a device's processing resources and network connection (e.g., turning the device into a "spambot.")

Embodiments as disclosed and claimed herein address these technical challenges by providing systems and methods for secure distributed processing across networks of heterogeneous processing nodes.

SUMMARY

This disclosure provides systems and methods for secure distributed processing across networks of heterogeneous processing nodes.

In a first embodiment, a method for distributed processing includes receiving a job bundle at a command center, wherein the command center includes a processor, a network interface, and a memory. Further, the method includes determining a value of a dimension of the job bundle, determining, based on a predetermined rule applied to the determined value of the dimension of the job bundle, an aggregate processing cost for the job bundle. Further operations include identifying one or more available member devices communicatively connected to the command center via the network interface and splitting the job bundle into one or more threads based on at least one of the determined value of the dimension, the aggregate processing cost or the available member devices. Additionally, the method includes the operations of apportioning a thread of the one or more threads to a member device and transmitting, via the network interface, the apportioned thread to a secure processing environment of the member device.

In a second embodiment, a method for distributed processing includes receiving, via a network interface, at a member device comprising a processor and a memory, a thread from a command center, receiving from the command center, via the network interface, a control parameter for the thread and processing the thread based on the control parameter in a secure processing environment of the member device.

In a third embodiment, a non-transitory computer-readable medium contains program code, which when executed by a processor, causes a command center to receive a job bundle at the command center, the command center comprising the processor, a network interface, and a memory. The non-transitory computer-readable medium further contains program code, which when executed by the processor, causes the command center to determine a value of a dimension of the job bundle, determine, based on a predetermined rule applied to the determined value of the dimension of the job bundle, an aggregate processing cost for the job bundle, identify one or more available member devices communicatively connected to the command center via the network interface, split the job bundle into one or more threads based on at least one of the determined value of the dimension, the aggregate processing cost or the available member devices, apportion a thread of the one or more threads to a member device and transmit, via the network interface, the apportioned thread to a secure processing environment of the member device.

In a fourth embodiment, a command center comprises a processor, a network interface, and a memory containing instructions, which when executed by the processor, cause the command center to receive a job bundle. The instructions, when executed by the processor, further cause the command center to determine a value of a dimension of the job bundle, determine, based on a predetermined rule applied to the determined value of the dimension of the job bundle, an aggregate processing cost for the job bundle, identify one or more available member devices communicatively connected to the command center via the network interface, split the job bundle into one or more threads based on at least one of the determined value of the dimension, the aggregate processing cost or the available member devices, apportion a thread of the one or more threads to a member device, and transmit, via the network interface, the apportioned thread to a secure processing environment of the member device.

In a fifth embodiment, a member device comprises a network interface, a processor and a memory containing instructions which, when executed by the processor, cause the member device to receive, via the network interface, a thread from a command center, receive from the command center, a control parameter for the thread, and process the thread based on the control parameter in a secure processing environment of the member device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
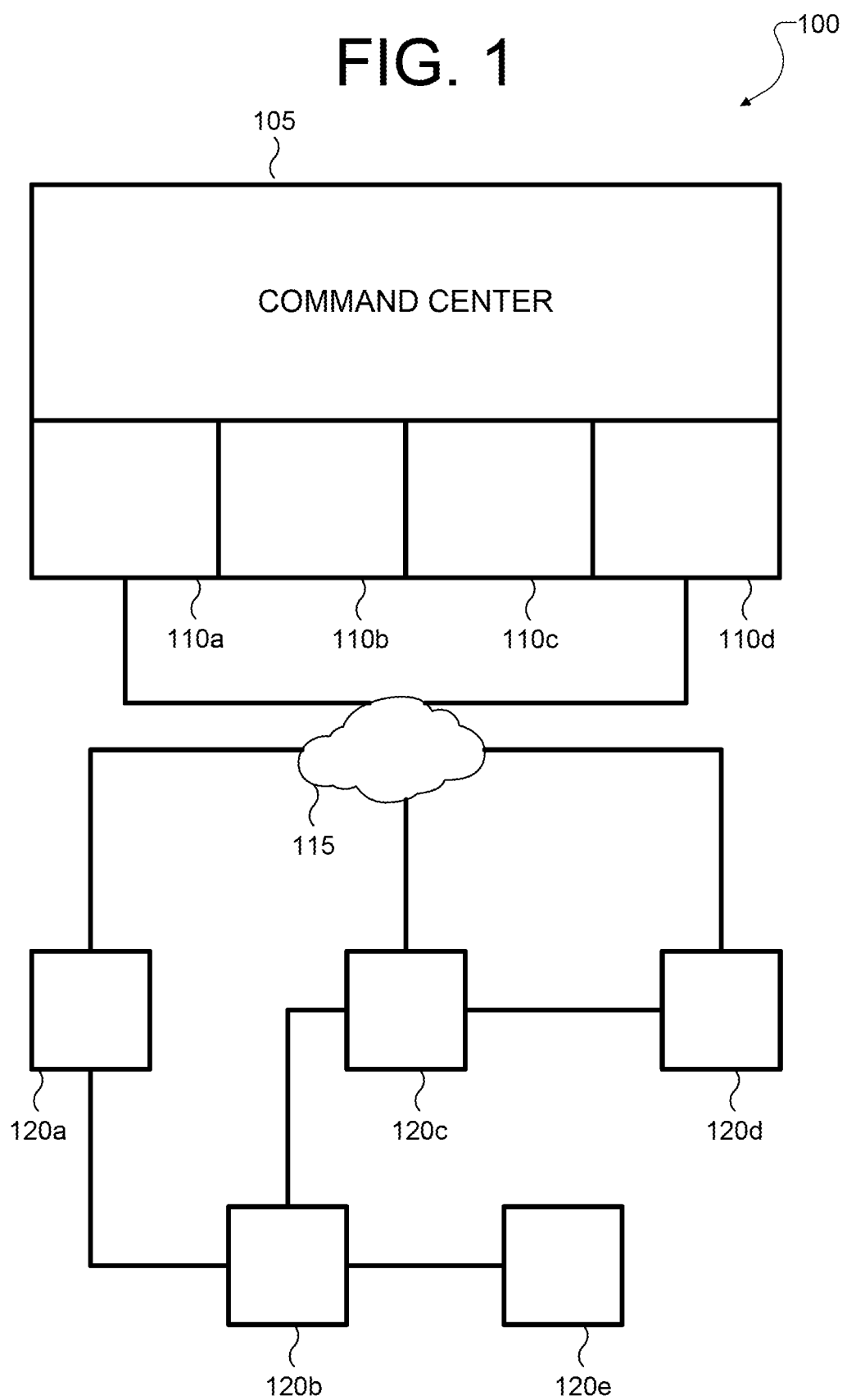
FIG. 1 illustrates an example of a network context including a command center and heterogeneous processing nodes according to certain embodiments of this disclosure.

FIG. 1 illustrates an example of a network context 100 including a command center and heterogeneous processing nodes according to certain embodiments of this disclosure.

According to certain embodiments, network context 100 includes a command center 105, one or more machines 110a, 110b, 110c and 110d providing an interface layer, one or more networks 115, and heterogeneous processing nodes 120a, 120b, 120c, 120d and 120e.

In the non-limiting example of FIG. 1, command center 105 is a management server, such as a Hewlett-Packard Proliant server embodied on a single server rack. According to certain embodiments, command center 105 includes program code, which when executed by one of the cores of command center 105's processor, causes it to provide an interface layer for connecting through a network 115 (such as the internet) with processing nodes 120a-e. As suggested by the presence of machines 110a-d, multiple architectures for implementing command center 105 are possible and within the scope of this disclosure. According to some embodiments, command center 105 is a single server, and machines 110a-d comprise virtual machines executing on the server. According to other embodiments, command center 105 may comprise multiple physical servers, with each of machines 110a-d implemented on its own server. According to still other embodiments, command center 105 and machines 110a-d are implemented in the cloud, across a variety of machines. Numerous embodiments, wherein a command center comprises a network interface and processing and memory resources for implementing an appropriate interface layer and performing operations of the disclosed methods are possible and within the scope of this disclosure.

According to certain embodiments, network 115 is a wired network connecting command center 105 to each of heterogeneous processing nodes 120a, 120c and 120d. According to other embodiments, network 115 is a wireless network, such as a Wi-Fi or 3G wireless network. Network 115 hosts communications using contextually appropriate network protocols, including without limitation, HTTP, Aeron, Message Queueing Telemetry Transport (MQTT), NanoIP, ROLL (Routing Over Low power and Lossy networks), uIP and UDP. Other communication protocols are possible and within the scope of the present disclosure.

According to certain embodiments, one or more networks of heterogeneous processing nodes 120a-120e connect to command center 105 through network 115. According to some embodiments, a processing node may connect directly to network 115, as shown in the non-limiting example of FIG. 1 by processing node 120a. Alternatively, according to other embodiments, a processing node may connect indirectly to network 115 through another processing node, as shown in the non-limiting example of FIG. 1 by processing node 120e. According to still embodiments, a processing node may connect both directly and indirectly to network 115, as shown in the non-limiting example of FIG. 1 by processing node 120c. For the purposes of this disclosure, processing nodes connected, either directly or indirectly to command center 105 through network 115 comprise "member devices" of a processing network under the control of command center 105.

According to certain embodiments, the member devices at each of processing nodes 120a-120e are, at a minimum, heterogeneous with regard to their processing and job handling capacities. Facets of heterogeneity between the member devices at processing nodes 120a-120e include, without limitation, processing speed, available RAM, power requirements available storage, types of network connectivity (for example, Wi-Fi connectivity, 3G connectivity, GigaBit Ethernet), available sensors (for example, microphones, thermometers, cameras, barometers), processor functionality (for example, floating point processing capability, capacity for true random number generation), and number of processor cores. According to certain embodiments, member devices may be classified by the command center based on one or more of these attributes. For example, a device having resources analogous to those of certain generations of the Raspberry Pi (for example, a 1 Ghz clock speed and 1 GB of storage), would for the purposes of the command center's job orchestration logic, be classified as a "10X" device. As a further example, a device having resources analogous to certain generations of an Amazon Echo (256 MB of RAM, 4 GB of storage, and multi-band wireless connectivity), may for the purposes of the command center's job orchestration logic, be classified as a "100X" device.

According to some embodiments, the heterogeneity of the member devices at the processing nodes includes additional dimensions, such as their availability to take on work at different times, and the processing resources available at different times. Thus, in contrast to, for example, a data center, wherein the management logic assumes that the processing capabilities of the machines potentially available to process jobs are not be time dependent, certain embodiments as disclosed and claimed can operate in contexts in which the underlying capacities of the available processing devices are more fluid and can change when, for example, devices are added or subtracted to the network, or devices are required to devote computing resources to tasks other than those orchestrated by the command center.

Although FIG. 1 illustrates one example of a network context including a command center and heterogeneous processing nodes, other embodiments, with more or less diffuse architectures may be possible. Additionally, according to some embodiments, a command center and processing node may be embodied on the same device.

Figure 2:
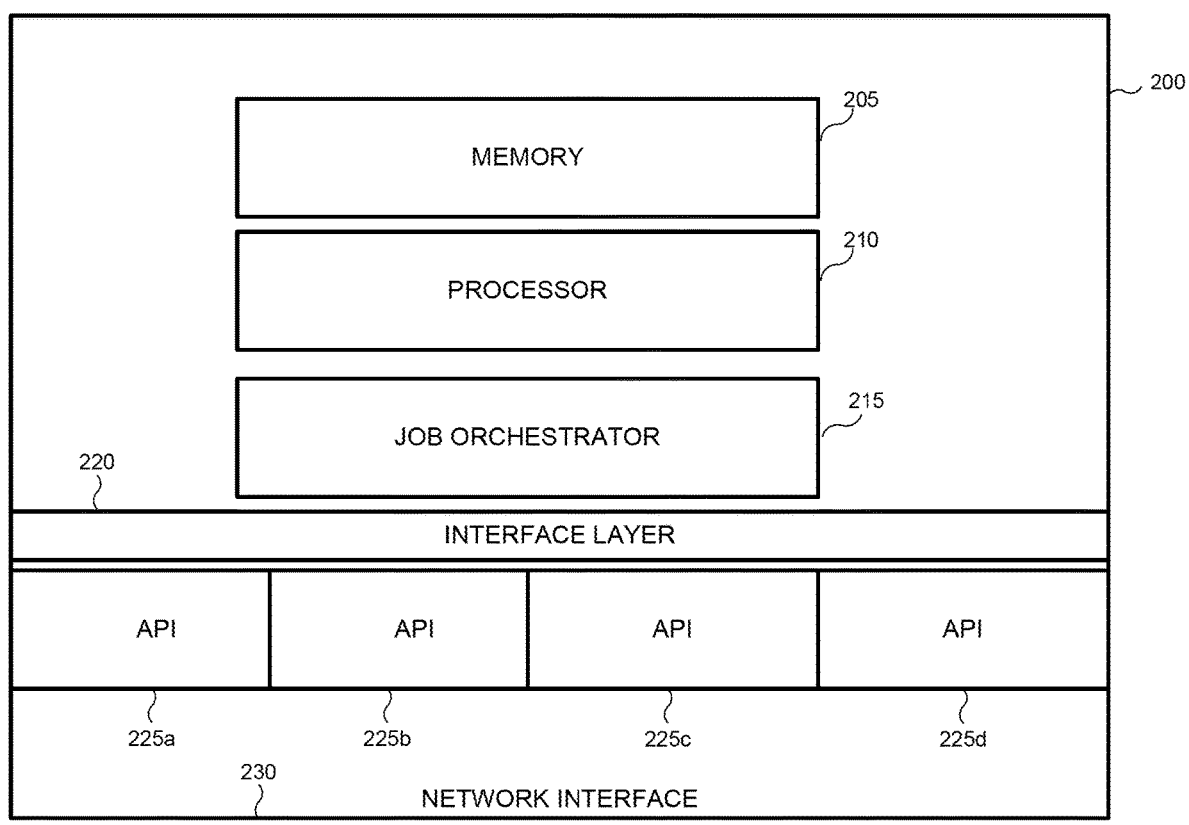
FIG. 2 illustrates an example of a command center according to certain embodiments of this disclosure.

FIG. 2 illustrates an example of a command center 200 according to certain embodiments of this disclosure.

In the non-limiting example of FIG. 2, command center 200 is implemented on a server and comprises a memory 205, a processor 210, a job orchestrator 215 and a network interface 230. Additionally, command center 200 is configured to implement an interface layer 220 comprising one or more instances shown as 225a-225d of application programming interfaces (API) through which command center 200 interacts with networked member devices (for example, the member devices at processing nodes 120a-120e in FIG. 1).

According to certain embodiments, memory 205 comprise a non-transitory memory containing program code, which, when executed by processor 210, causes the command center to receive a job bundle via network interface 230, split the job bundle into threads according to one or more determined dimensions of the job bundle, apportion the threads to available member devices, and transmit each apportioned thread to a secure processing environment on each member device.

Additionally, according to certain embodiments, memory 205 comprises libraries of rules and of capability information for member devices acting as processing nodes. According to certain embodiments, memory 205 includes a library of rules mapping dimensions of job bundles (for example, a specified deadline for completion of a processing task, a networking requirement (e.g., is the member device required to send and receive data over a 3G network?) a volume of data to be processed, a parameter of data to be collected such as a number of sensors to be used or a time interval over which data is to be collected, availability of parallel processing, load sharing constraints, processor or sensor requirements (e.g., clock speed, whether a floating point processor or true random number generation is required) to processing cost values.

According to some embodiments, memory 205 may contain one or more libraries of data specifying the processing capabilities of member devices. In some embodiments, libraries of member device capabilities may be maintained at a high level of granularity, with data for each member device, including, without limitation, information as to the device's specific processor and memory resources. Alternatively, according to other embodiments, the library of device capability information consists of a dictionary of device identifiers and a classification (e.g., "10X" or "100X") determined for the device. Numerous variations are possible and within the scope of this disclosure.

In certain embodiments, processor 210 is a central processing unit (CPU) chip provided within a server. According to other embodiments, command center 200 may be implemented across multiple servers, or as part of a cloud computing system. In such embodiments, processor 210 consists of multiple separate processors operating across a dynamically changeable cast of server machines. According to still other embodiments, command center 200 may be implemented on a virtual machine, and processor 210 is a virtual CPU consisting of an assignment of processor resources of the physical machine(s) implementing the virtual machine.

In certain embodiments, command center 200 includes a job orchestrator 215. According to some embodiments, job orchestrator 215 receives, through network interface 230, information regarding the availability and usage of member devices at processing nodes. Job orchestrator 215 further receives, from processor 210, information regarding the currently apportioned threads and received job bundles. In some embodiments, the information regarding the currently apportioned threads and received job bundles may be further processed and re-expressed as one or more metrics of system load at the node and command center levels. Further, in some embodiments, member devices at processing nodes may periodically send updates to the command center regarding their current processing load and/or job status information. In the non-limiting example of FIG. 2, job orchestrator 215 operates to apportion threads between member devices based in part on current usage data received from member devices and expected usage based on information regarding queued job bundles received from memory 205 and processor 210. According to certain embodiments, job orchestrator 215 dynamically apportions job bundles to available member devices according to the devices' availability and capabilities. Further, in the non-limiting example of FIG. 2, job orchestrator 215 implements predetermined rules applied to, for example, the determined parameters of the received job bundles and stored information regarding the capabilities of member devices at processing nodes, to apportion threads in a way that optimizes the value of one or more metrics of processing performance. Metrics of processing performance whose values may be maximized at job orchestrator 215 include, without limitation, job bundle execution time, electricity consumption at the processing node, redundancy among processing nodes (to increase the success of probabilistic execution of threads), and utilization of processing nodes (for example, it may be desirable to apportion the threads of a job bundle to a minimum number of processing nodes, in order to hold other nodes in reserve for other job bundles).

According to certain embodiments, apportioned threads are passed from the command center 200 to member devices, and returned results are provided to the command center from member devices via an interface layer 220. In the non-limiting example of FIG. 2, interface layer 220 includes network interface 230 and instances 225a-225d of application programming interfaces (API) through which command center 200 interacts with networked member devices (for example, the member devices at processing nodes 120a-120e in FIG. 1).

In some embodiments, network interface 230 operates to interconnect command center 200 with one or more networks (for example, network 115 in FIG. 1). Network interface 230 may, depending on embodiments, have a network address expressed as a node ID, a port number or an IP address. According to certain embodiments, network interface 230 is implemented as hardware, such as by a network interface card (NIC). Alternatively, network interface 230 may be implemented as software, such as by an instance of the java.net.NetworkInterface class. Additionally, according to some embodiments, network interface 230 supports communications over multiple protocols, such as TCP/IP as well as wireless protocols, such as 3G or Bluetooth.

In the non-limiting example of FIG. 2 interface layer 220 contains one or more application programming interfaces (APIs) 225a-225d for establishing communications between command center 200 and member devices at processing nodes. According to certain embodiments, each of APIs 225a-225d may designate portions of memory 205 as reserved for inputs and outputs of job bundles which have been apportioned and sent out for processing.

According to some embodiments, each API of APIs 225a-225d maps a set of preset processing functions (for example, to perform a hash function) associated with the performance of a thread to be processed. In some embodiments, the preset processing functions may be expressed in an object oriented format, and as comprising methods and attributes of APIs 225a-225d. For example, in some embodiments, the preset functions may map to API objects of an IoT specific operating system, such as the Conera platform developed by V2COM, Inc.

According to some embodiments, the preset processing functions may be mapped to device or operating system specific commands. For example, according to some embodiments, the API may map command center level function "hash" to the Java method "hashCode." Alternatively, according to other embodiments, each API of APIs 225a-225d may map preset functions to command sets appropriate to the processing power of a particular category of member device (for example, the "10X" and "100X" devices discussed above.) Alternatively, in some embodiments, there may only be a single API, which maps preset functions to commands across the full spectrum of operating systems and processing capabilities found in member devices at the processing nodes. According to still further embodiments, individual APIs or sets of APIs among APIs 225a-225d may provide mappings of command center level preset functions to different data models, in order to support communications across a wide range of networking contexts and capabilities of member devices. For example, in the non-limiting example of FIG. 2, APIs 225a & 225b may provide representational state transfer (REST) APIs associated with a JavaScript Object Notation (JSON) data model, while APIs 225c & 225d may provide simple object access protocol (SOAP) APIs associated with an extensible markup language (XML) data model. Numerous variations are possible and within the intended scope of this disclosure.

Figure 3:
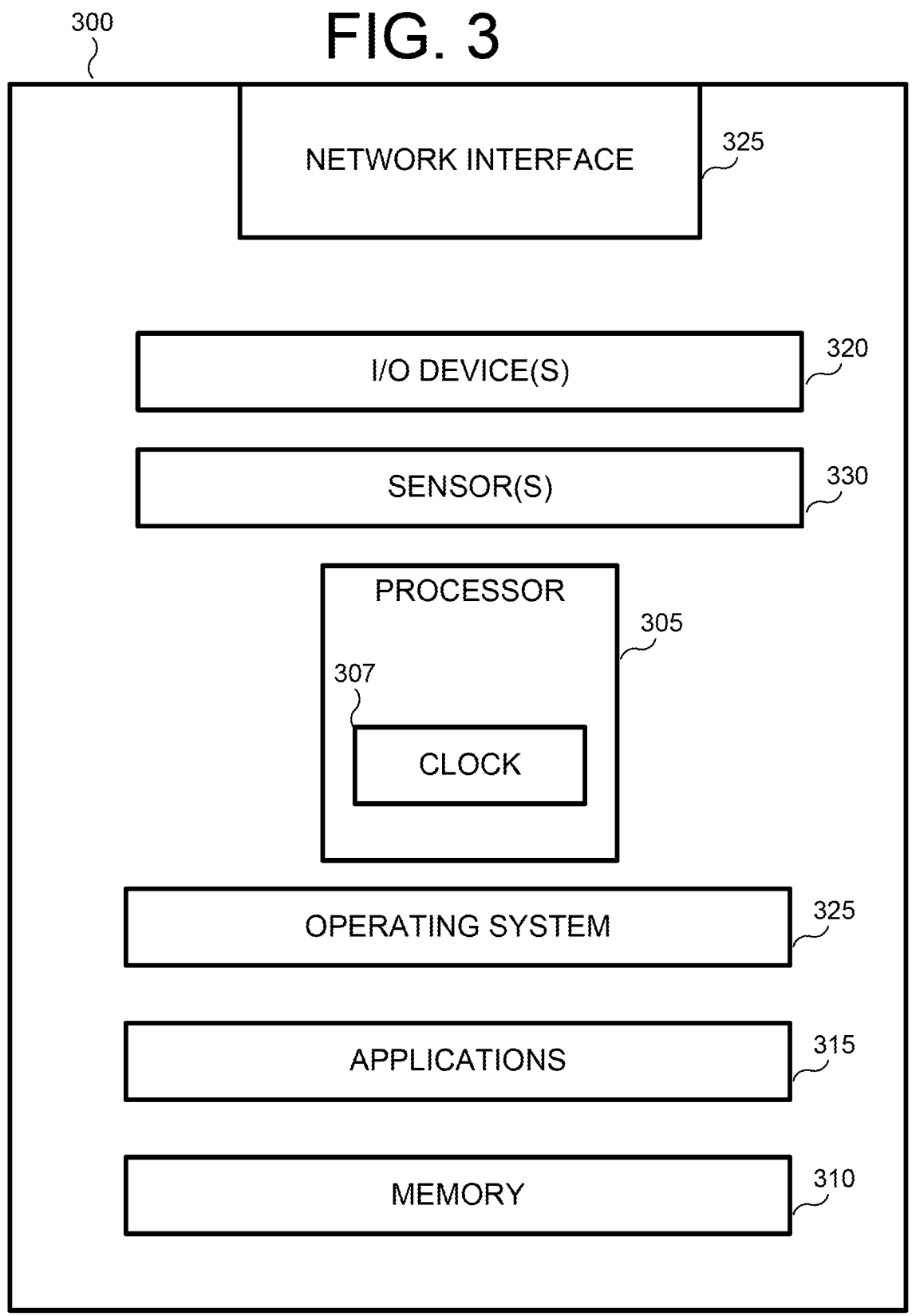
FIG. 3 illustrates an example of a member device according to certain embodiments of this disclosure.

FIG. 3 illustrates an example of a member device 300 according to certain embodiments of this disclosure. According to some embodiments, member device 300 is a "smart" type of another device, such as a household appliance or controller of other household appliances. According to other embodiments, member device 300 is a smartphone or a tablet computer. According to still other embodiments, member device 300 is a networked meter, or a development board attached to a point of presence (for example, a streetlight, a switch, a traffic light or a utility pole) of a public utility. According to still further embodiments, member device 300 can be a gateway device, such as an internet of things (IoT) gateway device. Examples of gateway devices which can function as a member device 300 include without limitation, the Neuron C Smart Concentrator and Dendrion Power Smart Submetering Unit by V2COM, Inc. and Numerous embodiments are possible and within the scope of this disclosure.

According to certain embodiments, member device 300 includes a processor 305. In the non-limiting example of FIG. 3, processor 305 is a multi-function processor (as opposed to, for example, a function-specific ASIC) with one or more cores, which capable of executing program code stored in a non-transitory memory 310. In the non-limiting example of FIG. 3, processor 305 includes, or is coupled with a clock 307, the speed of which provides one measure of the processor 305's processing capability. In some embodiments, processor 305 has features such as, for example and without limitation, floating point processing, true random number generation, or a smart cache, not found in the processor of other member devices.

According to some embodiments, memory 310 contains program code which, when executed by processor 305, causes the processor to perform the functions of the member device 300 of which it is a part. Returning to the non-limiting example of a controller of home automation system discussed herein, memory 310 contains instructions, which when executed by processor 305, cause it to perform functions, such as reading and writing temperature data to memory 310, controlling the operation of input/output devices 320 to send control signals for devices within the home (for example, smart lightbulbs, electronically controlled heaters and air conditioners, and electronically controlled window shades). Additionally, regions of memory 310 can be allocated for data storage and storing additional program code, including one or more applications 315.

According to certain embodiments, applications 315 comprise program code or software which can be written to memory 310 and read and executed by processor 305. In the non-limiting example of FIG. 3, applications 315 include, applications associated with the core function of the member device (for example, home automation applications, such as an application for automated control of internet connected lightbulbs), and virtual machines hosted on member device 300.

In the non-limiting example of FIG. 3, member device 300 has input/output devices 320. According to certain embodiments, input/output devices 300 include a display (such as an LED display), a keyboard and a mouse. According to other embodiments, I/O devices 320 are a set of input/output pins connected to pins of a processor or controller, such as processor 305.

In the non-limiting example of FIG. 3, member device 300 has an operating system (OS) 325, which supports member device 300's basic functions, including, without limitation, executing applications 315, receiving data from sensors 330, and sending and receiving data via network interface 325. According to some embodiments, OS 325 may be a general purpose operating system, such as Android or iOS. According to other embodiments, OS 325 may be a proprietary operating system such as Fire OS. According to still other embodiments, OS 325 is an IoT-oriented operating system, such as Conera by V2COM, Inc.

According to certain embodiments, member device 300 includes sensors 330. In the non-limiting example of FIG. 3, sensors 330 include, without limitation, cameras, microphones, thermometers, barometric sensors, light meters, energy monitors, water meters, and rain sensors.

In some embodiments, network interface 325 operates to interconnect member device 300 with one or more networks (for example, network 115 in FIG. 1). Network interface 325 may, depending on embodiments have a network address expressed as a node ID, a port number or an IP address. According to certain embodiments, network interface 325 is implemented as hardware, such as by a network interface card (NIC). Alternatively, network interface 325 may be implemented as software, such as by an instance of the java.net.NetworkInterface class. Additionally, according to some embodiments, network interface 325 supports communications over multiple protocols, such as TCP/IP as well as wireless protocols, such as 3G or Bluetooth.

Figure 4:
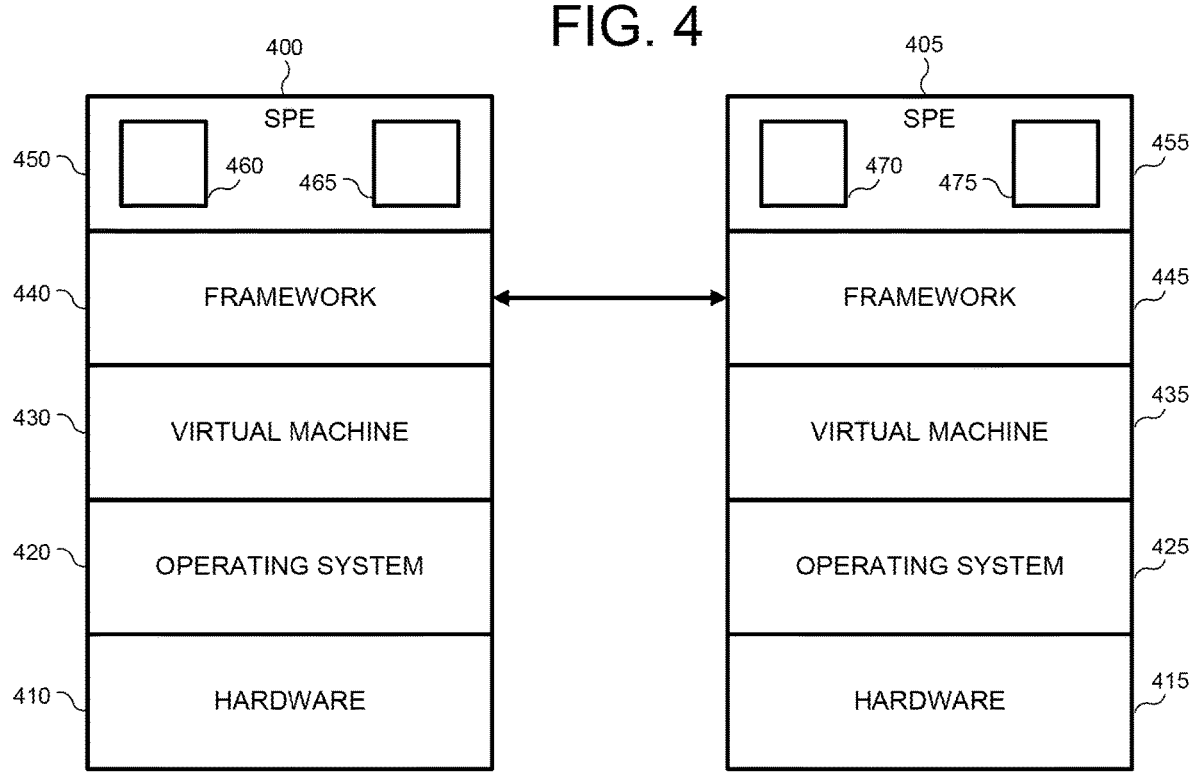
FIG. 4 illustrates layers of an I/O stack implemented in member devices according to certain embodiments of this disclosure.

FIG. 4 illustrates layers of an input/output ("I/O") stack implemented in member devices according to certain embodiments of this disclosure.

In the non-limiting example of FIG. 4, two distinct member devices 400 and 405 are shown. In the non-limiting example of FIG. 4, the processing architecture of each of member devices 400 is depicted as a hierarchy of abstraction layers, sometimes referred to collectively as an "I/O stack." According to certain embodiments, hardware layers 410 and 415 are the foundational level of the I/O stacks of member devices 400 and 405.

In some embodiments, each of hardware layers 410 and 415 comprise the processor and memory of the memory device (for example processor 305 and memory 310 shown in FIG. 3), as well the componentry of the member device under the direct control of a processor of the member device (for example, sensors 330 and network interface 325 shown in FIG. 3).

According to certain embodiments, operating system, or OS layers 420 and 425 comprise the next level of the I/O stacks of member devices 400 and 405. In some embodiments, OS layers 420 and 425 correspond to the functionalities provided by the operating systems (for example, OS 325 shown in FIG. 3) of each of member devices 400 and 405. Further, in some embodiments the OS on each member device is the native, or originally provided OS of the member device. For example, if member device 400 is an Apple® smartphone, operating system 420 is, according to some embodiments, the "iOS" operating system. Similarly, if member device 405 is an Amazon® reading device, operating system 425 is, according to some embodiments, the "Fire" operating system. Alternatively, according to some embodiments, the operating system at layers 420 and 425 is a specially adapted operating system, which replaces or augments the member devices' native operating systems, such as where the member devices' native operating systems only supports low-level communications (such as at the physical layer in the OSI model). Examples of suitable operating systems include, without limitation, the Conera IoT OS developed by V2COM, Inc. According to certain embodiments, a replacement operating system may enable the member device to communicate at a higher level within the OSI model and transmit data in formats beyond raw bit streams.

According to certain embodiments, virtual machine layers 430 and 435 comprise the next layer in the I/O stacks of member devices 400 and 405. According to some embodiments, virtual machine layers 430 and 435 are implemented as Java Virtual Machines, Azure Virtual Machines or as components of a Kubernetes system. In the non-limiting example of FIG. 4, each of virtual machine layers 430 and 435 operates to provide a secure container separating data, memory and processing resources for performing secure distributed processing across heterogeneous processing nodes. As such, each of virtual machine layers 430 and 435 separates the data and execution environment for processing apportioned threads from processes associated with the member device's native, or originally intended, functionality. For example, in cases where member device 400 is a network connected home automation controller, processes associated with the member device's functionality as a home automation controller, such as an interface for a web-based control application, cannot access data associated with an apportioned thread which is being processed at the member device.

According to certain embodiments, frameworks 440 and 445 comprise the next layer in the I/O stacks of member devices 400 and 405. According to some embodiments, frameworks 440 and 445 provide, at a logical level, the point of access for networked communications between member devices and between member devices and a command center (for example, command center 200 shown in FIG. 2). In the non-limiting example of FIG. 4, framework layer 440 of member device 400 is shown as connected to framework layer 445 of member device 405.

According to certain embodiments, each of framework layers 440 and 445 may implement system specific protocols or use commands (such as the preset functions implemented in the interface layer (for example, interface layer 220 shown in FIG. 2). In such embodiments, the system specific protocols and commands may define separate data and control channels for communications between heterogeneous nodes and the command center of the distributed processing network. According to some embodiments, an apportioned thread may be transmitted in part or in whole to a member device using a control channel provided at one of framework layers 440 and 445. According to other embodiments, an apportioned thread may be transmitted in part or in whole to a member device using a data channel provided at one of framework layers 440 and 445. Further, according to some embodiments, a member device transmits a thread for which processing has been completed, to a command center via the data channel or the control channel, or a combination thereof.

In the non-limiting example of FIG. 4, by implementing system specific protocols or using commands such as preset functions of the interface layer of a command center, or API specific methods, frameworks 440 and 445 further enforce the security of the data and processes performed within virtual machine layers 430 and 435 and above. For example, by only responding to commands and inputs expressed according to the preset commands of a command center, frameworks 440 and 445 may be less susceptible to spoofing attacks or requests expressed according to the command set of operating systems 420 and 425.

According to certain embodiments, secure processing environments ("SPEs") 450 and 455 comprise the next layer in the I/O stacks of member devices 400 and 405. According to certain embodiments, each of secure processing environments 450 and 455 provide, within each of virtual machines 430 and 435, an analogue to the trusted execution environment or "secure world" provided by certain physical processors. According to certain embodiments, threads 460, 465, 470 and 475 apportioned and transmitted by a command center are processed within each of SPEs 450 and 455. In some embodiments, multiple job threads are executed within a single SPE provided in the member device. According to other embodiments, there are multiple virtual machines running on a member device, and each virtual machine provides its own SPE, within which a job thread executes. Numerous variations are possible and within the contemplated scope of this disclosure.

Depending on, without limitation, a control parameter received from the command center and the underlying processing capabilities of hardware layers 410 and 415 the threads in each of SPEs 450 and 455 may be processed in parallel, or singly. Further, in some embodiments, each of the threads within an SPE are threads of different job bundles received and apportioned by a command center. Alternatively, in other embodiments, there are multiple threads belonging to the same job bundle being processed within the SPE of a particular member device. In some embodiments, a separate SPE is provided by the virtual machine and framework layers for each thread. According to such embodiments, proprietary data associated with one thread is not available to any other threads, thereby enhancing security.

The embodiments described with reference to FIG. 4 are illustrative and not intended to be limitative of the scope of this disclosure. Other embodiments not shown in FIG. 4 are possible and contemplated as part of this disclosure. For example, according to certain embodiments, a member device, such as member device 400, may implement multiple virtual machines. Further, each virtual machine may have its own secure processing environment. Additionally, according to other embodiments, multiple layers may be combined or implemented as part of a single abstraction layer. For example, in certain implementations utilizing the Conera operating system by V2COM, the Conera OS provides the framework layer and operating system layers.

Figure 5:
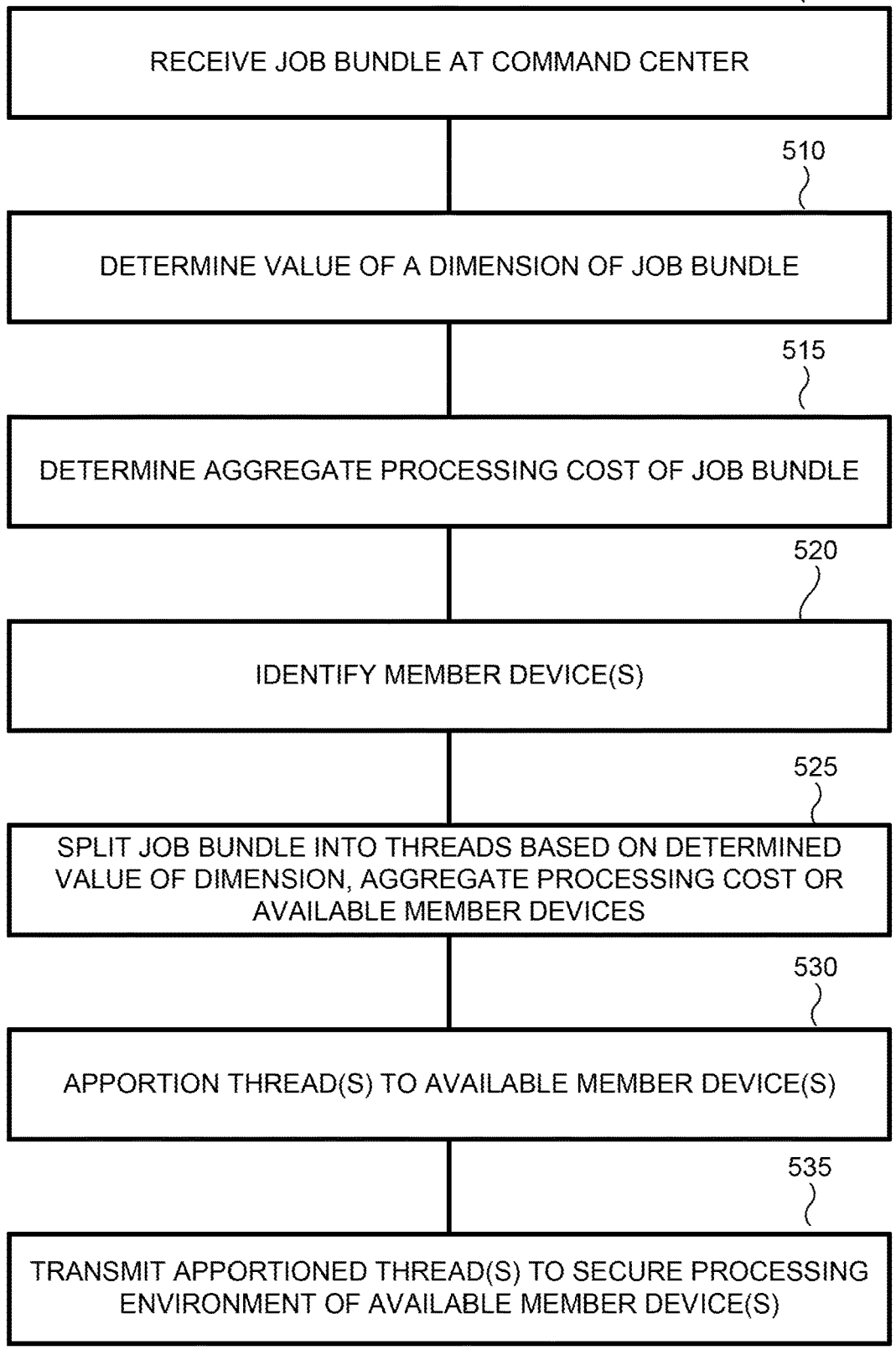
FIG. 5 illustrates operations of a method for secure distributed processing across networks of heterogeneous processing nodes at a command center according to certain embodiments of this disclosure.

FIG. 5 illustrates of a method 500 for secure distributed processing across networks of heterogeneous processing nodes at a command center, according to certain embodiments of this disclosure. In the non-limiting example of FIG. 5, job bundles are received at a command center, split into threads, and the threads are apportioned to member devices. Further, in this illustrative example, the threads are apportioned according to predetermined rules for optimizing the value of one or more metrics of processing performance, such as the time required to process a job bundle, or in cases where probabilistic execution is implemented, the overall probability of successful processing.

According to certain embodiments, method 500 comprises operation 505, wherein a job bundle is received at a command center. In some embodiments, the job bundle is a request for a processing task to be performed by a set of networked member devices, and which is received via a an interface provided by the command center. In some cases, the interface for receiving the job bundle may be a web interface, wherein the parameters are set by a visitor to a website. In other cases, the interface may receive job bundles from another machine or process without human interaction. According to certain embodiments, a job bundle is received as a set of data upon which one or more processing operations (for example, hashing, verification, or optical character recognition), along with a set of processing parameters (for example, a sensor requirement for member devices, a deadline for the processing task or a failure or interrupt handling parameter). According to other embodiments, a job bundle may contain executable code, and may also be received as an object comprising methods and attributes. According to certain other embodiments, the job bundle is received via a network interface of the command center (for example, network interface 230 shown in FIG. 2) via a network (such as network 115), as a request for a data collection and processing subject to certain job parameters. Examples of such embodiments include, without limitation, an ongoing request to collect and analyze temperature data collected across a set of member devices (for example, gateways, meters or controllers located on houses or points of presence of public utilities) covering a particular geographic area. In the non-limiting example of FIG. 5, the job bundle is received in a structured format, with data to be processed conforming to requirements (such as data to be analyzed being received in .SQL format) enforced by the interface. Other embodiments are possible, wherein data to be processed is unstructured (such as columns of a columnar database) and only the parameters defining the processing to be performed on the data conform to formats expected by the command center. Numerous variations are possible and within the intended scope of this disclosure.

In some embodiments, the job bundle received at the command center at operation 505 may have a payload developed and expressed in terms of the methods of the APIs (for example, APIs 225a-225d shown in FIG. 2). In one non-limiting example, the job bundle may be developed based on the APIs provided with the Conera IoT OS.

Additionally, in some embodiments, the job bundle received at the command center may further comprise information defining shared objects and common memory areas within the job bundle. For example, certain processing operations may require memory resources beyond those provided at any one processing node. In such cases, the command center may make some of its own memory available as a shared memory resource for processing the job bundle. In some embodiments, the memory made available as a shared resource may be the "input" or "output" memory provided by each of the APIs of the command center.

In some cases, a job bundle may be initially structured (or split by job orchestrator at operation 525) in a way that permits probabilistic execution and optimization of a value of one or more metrics of processing performance. In the context of this disclosure, probabilistic execution encompasses the concept of assigning certain constituent threads of the job bundle to multiple processing nodes, in the expectation that one or more processing nodes will fail or be unable to execute its assigned thread. The number of processing nodes to which a thread has been assigned corresponds to an overall probability of the thread's successful execution by at least one processing node.

In some embodiments, threads of a job bundle which may be assigned for probabilistic execution may be initially expressed in the job bundle with reference to idempotent methods of the command center APIs. In the context of this disclosure, idempotent methods encompass operations which, for a given input, provide the same output, regardless of time or place (e.g., different processing nodes) of execution. According to certain embodiments, as part of operation 530, threads of a job bundle expressed with reference to idempotent methods, are apportioned to multiple processing nodes for concurrent, probabilistic execution. In the non-limiting example of FIG. 5, all of the job threads, including the job bundle itself are cancellable. In other embodiments, only threads assigned for probabilistic execution are each individually cancellable, and can be cancelled in response to a signal from the command center that the thread has been successfully executed at a different node, or in response to a condition at the processing node (for example, a resource intensive task associated with the node's native function, such as speech recognition).

According to certain embodiments, method 500 proceeds to operation 510, wherein the command center determines one or more values of a dimension of the received job bundle. In some embodiments, the determined dimensions of a received job bundle are the amount of computational horsepower (expressed, for example, according to the number of FLOPS) required to process the job bundle, memory requirements associated with processing the job bundle, and availability requirements for processing the job bundle (for example, a minimum number of member devices required for successful probabilistic execution, or alternatively, a number of member devices which need to be kept free to process or receive other job bundles). Further examples of dimensions of a job bundle include, without limitation, memory usage associated with processing the job bundle, load sharing constraints between available member devices, processor requirements (for example, whether a floating point processor or true random number generation is required) associated with processing the job bundle, sensor requirements (for example, a job bundle entailing the collection of temperature data requires that some member devices have thermometers), a deadline for the job bundle, interrupt or failure protocols (for example, ignoring a thread which a member device fails to complete), or networking requirements (for example, a job bundle entailing analysis of wireless base station signal strengths requires that some member devices have, for example, 3G connectivity). Additional dimensions of a job bundle determined at operation 510 include further analysis of the memory requirements associated with processing the bundle, such as the relative amounts of volatile and permanent memory required at one or more processing nodes. Still further dimensions of the job bundle which can be determined at operation 510 include a determination as to whether the execution memory for the job bundle can be shared between multiple processing nodes, and rules for sharing memory resources between processing nodes. By sharing memory resources across processing nodes, certain embodiments according to this disclosure achieve a degree of biomimicry in their operation, in that, just as the human brain consolidates memories in particular regions of the brain during rapid eye motion ("REM") sleep, systems according to this disclosure may likewise consolidate the operational memory for executing the job bundle.

According to certain embodiments, the determination of a dimension of a job bundle may be performed by analyzing metadata provided as a part of a request from an interface where the job bundle was initially received by the command center. For example, in submitting the job for processing, a client of the interface may also specify dimensions of the job bundle and values thereof. Alternatively, determination of a value of a dimension of a job bundle may be performed by a rules engine at the command center, which applies one or more predetermined rules to analyze the data and instructions of the job bundle.

According to certain embodiments, method 500 then proceeds to operation 515, wherein the command center determines an aggregate processing cost for processing the job bundle. In some embodiments, the aggregate processing cost is a static analysis performed by applying one or more predetermined rules to the one or more values of dimensions of the job bundle (for example dimensions of the job bundle determined at operation 510). For example, if, at operation 510, the number of member devices required to process a task and classification of the capabilities of the member devices (for example "10X," "100X" devices, etc.) are dimensions of the job bundle, then in the case where the command center determines that at least five (5) "10X" member devices are required to process the job, a predetermined rule specifying the number of devices required multiplied by the classification of the devices is applied. In this non-limiting example, the job bundle is determined to have a cost of fifty (50) units.

According to some embodiments, the aggregate processing cost determined at operation 515 may serve as the basis of a monetary cost to be charged to the entity submitting the job request. Alternatively, according to other embodiments, such as those where a volume of computational work operates as a proxy for scarcity or to enforce an aspect of the security of a job bundle (such as the computation of a large hash), the determination of an aggregate processing cost at operation 515 provides a gating function, excluding fraudulent job bundles or job bundles which do not conform to expected values of aggregated processing costs or expected values of specified dimensions.

According to certain embodiments, method 500 then proceeds to operation 520, wherein the command center identifies one or more available member devices communicatively connected to the command center via the network interface. In the non-limiting example of FIG. 5, member devices communicatively connected to the command center via the network transmit "heartbeat" messages at predetermined intervals, informing the command center of their connectivity and availability. Based on the received "heartbeat" messages, a register of job bundles currently being processed and information as to job bundles in a processing queue, the command center is able to determine which member devices are available. According to other embodiments, the command center performs an identification of available devices based on member devices satisfying defined constraints on the job bundle (such as processing capabilities).

In some embodiments, method 500 then proceeds to operation 525, wherein the control center splits the job bundle into threads for processing by available member devices. According to some embodiments, a job bundle is split into threads based on the determined value of one or more dimensions of the job bundle. For example, if a job bundle requires processing a total of 10 gigabytes of data, and each of the available member devices has only 1 GB of available storage, the command center may split the job bundle into ten or more threads, based on data volume and memory resources of the available devices as determined dimensions of the job bundle. According to other embodiments, a job bundle is split into threads based on the determined aggregate processing cost of the job bundle or according to the member devices available to process the job. According to other embodiments, the command center splits the job bundle into threads based on other factors, such as deadline for completing the task.

In the non-limiting example of FIG. 5, as part splitting the job bundle into threads at operation 525, the command center also generates a set of commands for the member devices. According to certain embodiments, the commands for the member devices may be expressed in terms of the preset functions specified by an API of the command center (for example, APIs 225a-225d shown in FIG. 2), or preset functions utilized by a framework (for example, framework layers 440 and 445 shown in FIG. 4) on member devices processing the job thread. Further, splitting the job bundle into threads at operation 525 can, according to certain embodiments of this disclosure, include encrypting sensitive or user-specific data to be distributed to member devices as part of a thread for processing. According to such embodiments, the data of the entity submitting the job is secured against possible thefts or hacking of member devices processing a thread of the job bundle.

According to certain embodiments, at operation 530, each of the determined threads is apportioned to an available member device. In the non-limiting example of FIG. 5, such apportionment comprises: a.) specifically assigning each of the determined threads to a member device; and b.) creating or updating a registry or data structure recording the apportionment of each thread a job bundle to a specific member device. According to some embodiments, this data structure is maintained at the command center. According to other embodiments, the data structure recording the assignment or apportionment of job threads to member devices may be maintained across multiple machines as a safeguard against failure or loss of a copy of the registry at the command center.

According to certain embodiments, at operation 535, the command center transmits each of the apportioned threads to a secure processing environment (for example, SPEs 450 and 455 shown in FIG. 5) of member devices comprising processing nodes of a distributed network. In some embodiments, the apportioned threads are transmitted via a network interface of the command center, to a network, and then to a framework on each of the member devices. In other embodiments, including without limitation, embodiments employing the V2COM Conera APIs at the command center, the apportioned threads are transmitted through a control channel provided by the API.

Further, at operation 535, certain embodiments transmit one or more control parameters, such as a deadline for completing the processing task or failure/interrupt parameters corresponding to each thread of the apportioned threads. Additionally, in some embodiments, as part of transmitting apportioned threads to SPEs on available member devices, the command center also transmits a copy of the command center's public key for encryption, so that, upon completing processing a thread, the member devices can encrypt the results of their processing before transmitting the completed thread back to the command center.

According to certain embodiments, threads for execution may be separately transmitted and triggered for execution. For example, at operation 535, the command center may transmit the threads to the member devices through a control channel provided by APIs at the control center. The threads may then be received at the member devices and pre-loaded into the secure processing environments of the member devices. Upon satisfaction of a predetermined condition (for example, receiving confirmation that a threshold number of threads have been successfully received and loaded in member devices' SPEs), the command center may then issue a call stack, triggering execution of each of the received threads.

Figure 6:
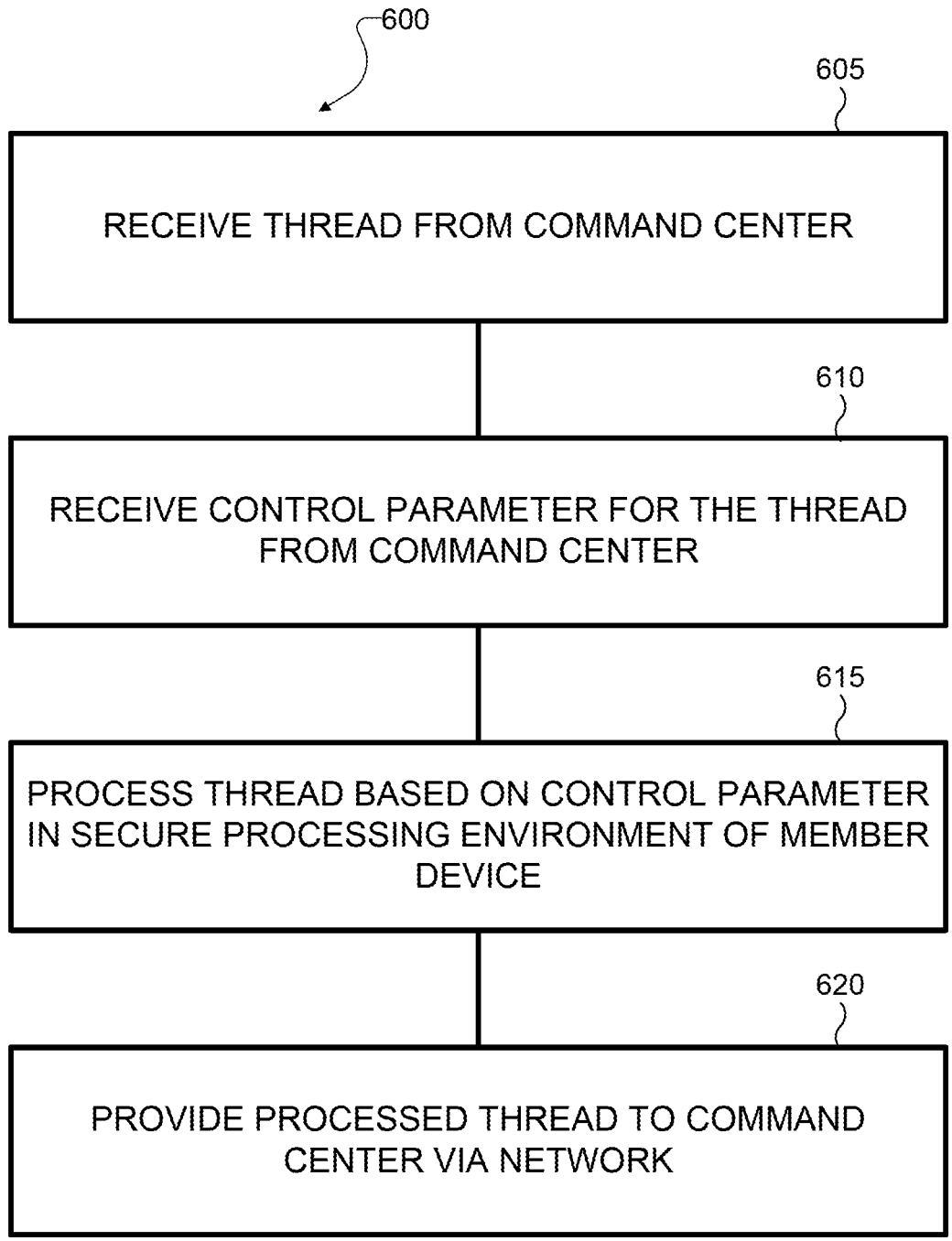
FIG. 6 illustrates operations of a method for secure distributed processing across networks of heterogeneous processing nodes at a member device according to certain embodiments of this disclosure.

FIG. 6 illustrates operations of a method 600 for secure distributed processing across networks of heterogeneous processing nodes at a member device according to certain embodiments of this disclosure.

According to certain embodiments, method 600 begins at operation 605, wherein a member device receives an apportioned thread from a command center via a network. According to other embodiments, a member device may receive an apportioned thread from a command center indirectly, such as via a connection with another member device (for example, the connection between frameworks 440 and 445 shown in FIG. 4). Depending on, without limitation, the processing capabilities and availability of the member devices, each member device may only receive a single thread of a job bundle from the command center, or member devices may receive multiple threads of a job bundle from the command center.

According to certain embodiments, at operation 610, each member device receives one or more control parameters associated with processing the thread from a command center. Depending on embodiments, the control parameter may specify at least one of, a deadline for completion of the apportioned thread, failure/interrupt instructions for processing the apportioned thread, or encryption/decryption instructions for transmitting the thread to the command center upon completion.

In some embodiments, at operation 615, the member device processes the apportioned thread in the secure processing environment of the member device according to the control parameter received from the control center. Further, at operation 620, the member device provides the processed thread to the command center via a network. According to certain embodiments, as part of transmitting the completed job thread back to the command center, the member device may sign or encrypt the completed thread using the public key of the command center, or some other indicia of trustworthiness to the command center that the processed thread was received from the member device to which it was assigned.

In the non-limiting example of FIG. 5, the security of the system is backstopped by the security in the top layer of the I/O stack (for example, the I/O stack shown in FIG. 4) by the application-layer security provided through the secure processing environment of the member device. Thus, while the network to which member devices are connected may be secure, and the member devices themselves may not be secure, the implementation of a secure processing environment at the member device allows the system of distributed processing nodes to nonetheless be secure. According to certain embodiments, the security of the system for distributed processing is enforced because the secure processing environment of each member device is inaccessible to other processes executing on the member device. Additionally, in some embodiments, the security of the system may be further enforced by encrypting content entering and exiting the SPE, and the SPE only accepting content using the command set of the command center's APIs.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for distributed processing, the method comprising:
   receiving a job bundle at a command center comprising a processor, a network interface, and a memory;
   determining a value of a dimension of the job bundle;
   determining, based at least in part on a predetermined rule applied to the determined value of the dimension of the job bundle, an aggregate processing cost for the job bundle;
   identifying a plurality of available member devices communicatively connected to the command center via the network interface;
   splitting the job bundle into one or more threads based on at least one of the determined value of the dimension, the aggregate processing cost, or the available member devices;
   apportioning a thread of the one or more threads to a selected member device of the one or more available member devices; and
   transmitting, via the network interface, the apportioned thread to a secure processing environment of the selected member device, wherein the secure processing environment comprises a virtual machine layer that operates to separate processing resources of the selected member device from processing resources of at least one other of the plurality of available member devices.

2. The method of claim 1, wherein the dimension of the job bundle includes at least one of a memory usage, a clock speed of a processor, whether threads of the job bundle are to be processed in parallel, load sharing constraints between available member devices, presence of a floating point processor, a required sensor, a deadline for the job bundle, a processing interrupt parameter, availability of true random number generation, or a parameter associated with a networking capability.

3. The method of claim 1, wherein the apportioned thread is transmitted via a control channel between the command center and the member device.

4. The method of claim 1, further comprising:
   apportioning a second thread of the one or more threads to a second member device; and
   transmitting, via the network interface, the apportioned second thread to a secure processing environment of the second member device.

5. The method of claim 1, wherein the threads are apportioned to be performed in parallel.

6. The method of claim 1, further comprising:
   receiving, at the command center, via the network interface, a completed apportioned thread from the selected member device.

7. A method for distributed processing, the method comprising:
   receiving, via a network interface, at a selected member device of a plurality of available member devices, a thread from a command center;
   receiving from the command center, via the network interface, a control parameter for the thread; and
   processing the thread based on the control parameter in a secure processing environment of the selected member device, wherein the secure processing environment comprises a virtual machine layer that operates to separate processing resources of the selected member device from processing resources of at least one other of the plurality of available member devices.

8. The method of claim 7, wherein the secure processing environment is provided by a framework operating on Java virtual machine implemented on the member device.

9. The method of claim 8, wherein the framework on the selected member device is communicatively connected to a framework on a second member device.

10. The method of claim 7, further comprising:
receiving, via the network interface, a second thread from the command center,
receiving, from the command center, via the network interface, a control parameter for the second thread; and
processing the thread based on the control parameter for the second thread in a second secure processing environment of the selected member device,
wherein processing resources of the selected member device associated with the secure processing environment are isolated from processing resources associated with the second secure processing environment.

11. The method of claim 7, wherein processing resources associated with the secure processing environment of the selected member device are isolated from processes and memory associated with an application running on the selected member device.

12. The method of claim 7, wherein the control parameter is associated with at least one of a schedule for processing the thread, an interrupt protocol for the thread, or a failure protocol for the thread.

13. A non-transitory computer-readable medium containing program code, which when executed by a processor, causes a command center to:
receive a job bundle at the command center, the command center comprising the processor, a network interface, and a memory;
determine a value of a dimension of the job bundle;
determine, based at least in part on a predetermined rule applied to the determined value of the dimension of the job bundle, an aggregate processing cost for the job bundle;
identify a plurality of available member devices communicatively connected to the command center via the network interface;
split the job bundle into one or more threads based on at least one of the determined value of the dimension, the aggregate processing cost, or the available member devices;
apportion a thread of the one or more threads to a selected member device of the one or more available member devices; and
transmit, via the network interface, the apportioned thread to a secure processing environment of the selected member device, wherein the secure processing environment comprises a virtual machine layer that operates to separate processing resources of the selected member device from processing resources of at least one other of the plurality of available member devices.

14. The non-transitory computer-readable medium of claim 13, wherein the dimension of the job bundle includes at least one of a memory usage, a clock speed of a processor, whether threads of the job bundle are to be processed in parallel, load sharing constraints between available member devices, presence of a floating point processor, a required sensor, a deadline for the job bundle, a processing interrupt parameter, availability of true random number generation, or a parameter associated with a networking capability.

15. The non-transitory computer-readable medium of claim 13, wherein the apportioned thread is transmitted via a control channel between the command center and the member device.

16. The non-transitory computer-readable medium of claim 13, further comprising program code, which when executed by the processor, causes the command center to:
apportion a second thread of the one or more threads to a second member device; and
transmit, via the network interface, the apportioned second thread to a secure processing environment of the second member device.

17. The non-transitory computer-readable medium of claim 13, wherein the threads are apportioned to be performed in parallel.

18. The non-transitory computer-readable medium of claim 13, comprising program code which, when executed by the processor, causes the command center to:
receive, via the network interface, a completed apportioned thread from the selected member device.

19. A command center comprising:
a processor;
a network interface; and
a memory containing instructions which, when executed by the processor, cause the command center to:
receive a job bundle,
determine a value of a dimension of the job bundle,
determine, based at least in part on a predetermined rule applied to the determined value of the dimension of the job bundle, an aggregate processing cost for the job bundle,
identify a plurality of available member devices communicatively connected to the command center via the network interface,
split the job bundle into one or more threads based on at least one of the determined value of the dimension, the aggregate processing cost, or the available member devices,
apportion a thread of the one or more threads to a selected member device of the one or more available member devices, and
transmit, via the network interface, the apportioned thread to a secure processing environment of the selected member device, wherein the secure processing environment comprises a virtual machine layer that operates to separate processing resources of the selected member device from processing resources of at least one other of the plurality of available member devices.

20. A member device, comprising:
a network interface;
a processor; and
a memory containing instructions which, when executed by the processor, cause the member device to:
receive, via the network interface, a thread from a command center,
receive from the command center, via the network interface, a control parameter for the thread, and
process the thread based on the control parameter in a secure processing environment of the member device, wherein the secure processing environment comprises a virtual machine layer that operates to separate processing resources of the selected member device from processing resources of at least one other of the plurality of available member devices.

\* \* \* \* \*